Figure 1:
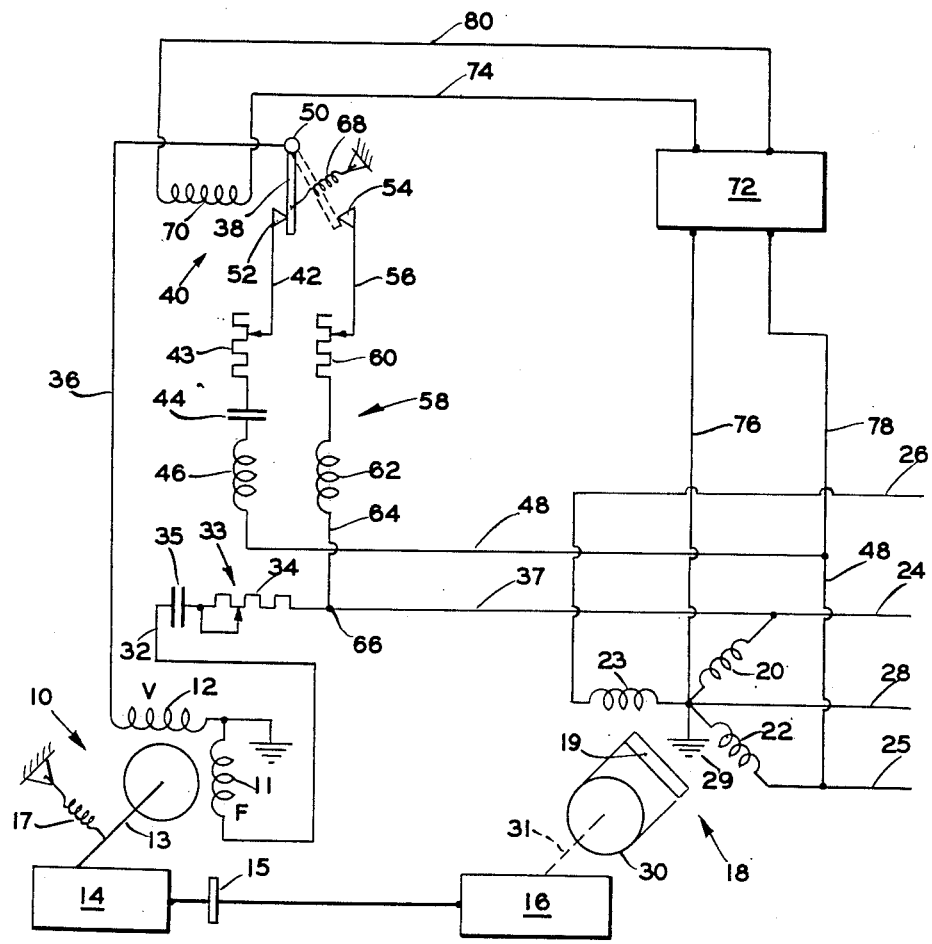

April 28, 1953 P. W. FRANKLIN 2,637,015
FREQUENCY REGULATOR
Filed Aug. 23, 1949

INVENTOR.
PAUL W. FRANKLIN
BY

ATTORNEY

Patented Apr. 28, 1953

2,637,015

UNITED STATES PATENT OFFICE 2,637,015

FREQUENCY REGULATOR

Paul W. Franklin, Nutley, N. J., assignor to Bendix Aviation Corporation, Teterboro, N. J., a corporation of Delaware Application August 23, 1949, Serial No. 111,926

6 Claims. (Cl. 322—32)

The present invention relates to frequency responsive apparatus and more particularly to that type suitable for regulating the speed of a motor or generator.

The invention finds particularly utile application in such accessories for aircraft as air driven power supplies wherein it is sought to operate a throttle for controlling the speed of a prime mover, by means of an electric torque motor responsive to the output of an alternator driven by said prime mover.

Such an arrangement is illustrated in copending application filed July 14, 1949, Serial No. 104,714 by Walter D. Teague, Jr. and John S. Jacquith and assigned to the assignee of the present application.

One of the objects of the present invention, therefore, is to provide means for regulating the speed of a prime mover by controlling a throttle, field rheostat or any other speed adjusting device in connection with said prime mover, by means of an electric motor, providing torque responsive to the frequency and therefore the speed of an alternator driven by said prime mover.

Another object of the invention is to provide means for preventing an alternator or motor or the like from overspeeding and to do so in a novel and effective manner.

Still another object of the invention is to provide a system of the above indicated nature in which all of the components are capable of operation at relatively high temperatures due to the combination of said components.

Still another object of the invention is to provide a novel and improved frequency regulator circuit contemplating the use of a series resonant circuit to accomplish regulation.

Still another object of the invention is to provide a frequency sensitive source of torque, adaptable to be applied to a a regulator or servo mechanism for speed regulation.

Still another object of the invention is to provide a system of the above-indicated nature having a high ratio between torque change and frequency change, thus providing means for close speed regulation.

Still another object of the invention is to provide motor regulating means whereby the variable phase of a troque motor is connected to an alternator through a resonant circuit, and an overspeed safety device embodying filter means is adapted to cut out said resonant circuit past the resonant frequency of said circuit.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for the purposes of illustration only and is not to be construed as defining the limits of the invention.

Fig. 1 of the drawing is a diagrammatic view illustrating a control system embodying one form of the invention.

Figure 2:
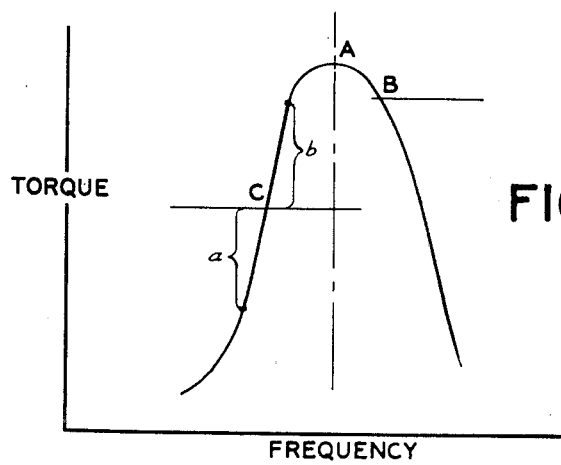
Figure 2:

Fig. 2 is a graph showing the torque curves of the spring 17 and the motor 10 when the variable phase is connected thru the resonant circuit, as a function of the frequency of the alternator herein.

Referring now to the drawing, a two phase actuator motor is generally designated by the numeral 10 having a fixed phase winding 11 and a variable phase winding 12. The rotor shaft 13 of the motor 10 controls an air servo 14 which in turn operates a throttle 15, which governs the flow of driving fluid to a prime mover 16. The shaft 13 of the torque motor 10 turns against the adjustable force of a spring 17. There is further provided an alternator 18 having a permanent magnet 19 and three phase stator windings 20, 22 and 23, having output conductors 24, 25 and 26, respectively and a center output conductor 28 grounded as at 29. The rotor 30 of the alternator 18 is on a common shaft 31 with the prime mover 16 and is driven thereby.

The fixed phase winding 11 of the motor 10 is connected by means of conductor 32, phase shift 33, including a variable resistor 34 and a capacitance 35 and a conductor 37 to the phase winding 20 of the alternator 18, and the variable phase winding 12 of the motor 10 is connected to the phase winding 22 of the alternator 18 through a series resonant circuit consisting of a conductor 36, the relay arm 38 of a relay 40, the function of which is hereinafter explained, a conductor 42, a variable resistor 43, a capacitance 44, an inductance 46 and a conductor 48.

It is to be noted that the aforenoted circuit from the variable phase winding 12 of the motor 10 to the phase winding 22 of the alternator 18 is operative only when the relay arm 38 of the relay 40 closes contact 52, for when the relay arm 38 is in its opposite position, thereby connecting contact 54, the variable phase winding 12 of the motor 10 will be connected to phase winding 20 of the alternator 18 by means of conductor 36, relay arm 38, conductor 56, phase shift 58 including a variable resistor 60 and an inductance 62, and conductor 64 joining conductor 37 at point 66, thereby cutting out the capacitance 44 and the inductance 46.

The relay 40 is of a type well known in the art, and, when a coil 70 is energized, operates to normally close switch arm 38 and contact 52 thereby overcoming a spring 68. When the coil 70 is de-energized, the spring 68 will urge the relay arm 38 to close contact 54. The relay 40 has a coil 70 connected across phase 22 of the alternator 18 through a low pass filter 72 of conventional type well known in the art. The coil 70 is connected in a circuit including conductors 74, 76, 48, 78 and 80.

The energizing of the relay 40 is controlled by the low pass filter 72 which is set to permit only current with a frequency below a predetermined value to pass therethrough, and it will be apparent that in the instant device the filter 72 will be set to pass only currents of frequencies up to the value of the point marked "B" in Fig. 2 to the circuit comprising the variable phase winding 12 of the motor 10, conductor 36, relay arm 38, conductor 42, variable resistor 43, capacitance 44 and inductance 46 and conductor 48, for when the frequency output of the alternator 18 exceeds the above-mentioned critical frequency of said filter circuit, it is desirable to de-energize the coil 70 of the relay 40 thereby causing spring 68 to urge arm 38 to connect terminal 50 to terminal 54 so as to cut out capacitance 44 and inductance 46.

It is to be noted that a high pass filter of the type commonly employed in the art might be employed to equal advantage in lieu of low pass filter 72 by merely reversing the position of spring 68, and of coil 70 so that coil 70 would then be normally de-energized, and upon becoming energized would overcome the spring 68 to bring terminal 50 into contact with terminal 54.

As the frequency of the alternator 18 which is driven by the prime mover 16 whose speed it is desired to regulate increases due to an increase in the speed of the prime mover, there will be a corresponding increase in the current through the variable phase winding 12 as the resonant frequency of the series resonant circuit comprising the capacitance 44, and the inductance 46 is approached, resulting in a corresponding increase in output torque of the shaft 13 of the motor 10. The increased torque will overcome the tension of the spring 17 and actuate the servo 14 to operate the throttle 15 in a speed decreasing direction as the output frequency of the alternator exceeds the regulated value of point "C" of Fig. 2 and upon the output frequency of the alternator decreasing below the point "C" of Fig. 2 the servo 14 is actuated so as to operate the throttle 15 in a speed decreasing direction.

The adjustable tension in the spring 17 is arranged so that at alternator frequencies below the point A (Fig. 2), of the circuit including capacitance 44 and inductance 46, the resulting differential torque between the spring 17 and the torque supplied by the motor 10 designated in Fig. 2 as the distances "a" and "b" is approximately proportional to the frequency deviation from the set frequency "C."

It will now be seen that since the rotor shaft 13 of the motor 10 controls the servo 14 to actuate the throttle 15, the speed of the prime mover 16, and therefore of the alternator 18 may be controlled by the motor 10, so that with an increase in prime mover speed, in excess of a predetermined value designated by point "C" in Fig. 2, power to the prime mover is decreased by closing the throttle 15, and with a decrease in prime mover speed below the predetermined value "C," power available to the prime mover 16 is increased by opening the throttle 15. The action of the spring 17 is such as to maintain the throttle 15 open when no torque is furnished by the motor 10 such as at the beginning of operation of the device.

The manner in which overspeeding of the prime mover 16 is prevented is as follows:

The capacitance 44 and the inductance 46 are connected in series between the motor 10 and the alternator 18 by means of conductor 36, relay arm 38, conductor 42, variable resistor 43 and capacitance 44, inductance 46 and conductor 48.

As the speed of the prime mover 16 increases towards a critical value, designated at "B" in Fig. 2, the alternator 18 driven thereby will supply a higher frequency voltage to the low pass filter 72. The filter 72 is set so that only frequencies below said critical value, or point "B," are permitted to energize coil 70 of relay 40 to cause the relay arm 38 to connect terminals 50 and 52. When the frequency output of the alternator 18 is in excess of said critical value, no current will pass through the filter 72, and the coil 70 of the relay 40 will be de-energized, thereby enabling the spring 68 to urge the control arm 38 to connect terminals 50 and 54, thereby cutting out the capacitance 44 and the inductance 46, and connecting the motor 10 directly to the alternator 18 by means of conductor 36, relay arm 38, conductor 56, phase shift 58, and conductors 64 and 37. The coil 70 of the relay 40 will be immediately energized to operate the arm 38 as soon as a voltage is generated from the alternator 18.

A voltage will, therefore, be impressed upon the two phase control motor 10 of proper phase so as to cause the torque of the motor 10 to be maintained at a value in excess of the force of the spring 17 causing the servo 14 to close the throttle 15 thereby cutting off the supply of driving fluid to the prime mover 16 and thereby decreasing its speed.

When the prime mover 16 slows down sufficiently so that the frequency output voltage of the alternator 18 is below the aforementioned critical-value, current will again pass through the filter 72 and energize the coil 70 of the relay 40 so that the relay arm 38 will again connect the terminal 50 to the terminal 52, and the control motor 10 will again be connected to the alternator 18 through the series resonant circuit including capacitance 44 and inductance 46 to thereby provide normal frequency control.

The leading phase shift control 33 comprising a variable resistor 34 and the capacitance 35 is set to optimum phase relationship between the variable phase winding 12 and the fixed phase winding 11 of the motor 10 when terminal 50 is connected to terminal 52, and the lagging phase shift control 58 comprising the variable resistor 60 and the inductance 62 is set to optimum phase relationship between the fixed phase winding 11 and the variable phase winding 12 of the motor 10 when the terminal 50 of the relay 40 is connected to terminal 54.

It will thus be apparent that there are provided means for regulating the speed of a prime mover by controlling a throttle by means of an electric torque motor responsive to the frequency output of an alternator driven by said prime mover, and low pass filter means for preventing the overspeeding of said alternator.

A particular feature of said torque development of the motor 10 consists in the fact that the resulting torque is not only a function of the currents in windings 11 and 12, but also depends upon the time angle between both currents. It should be noted that the resonant circuit comprising elements 43, 44 and 46, does not only change the actual amount of the current in phase winding 12, but also its time angle with regard to the fixed phase current in winding 11. Therefore, with varying frequency the resulting motor torque changes at a particularly high rate as shown by the relatively sharp shape of the motor torque curve in Fig. 2. Toward this end, the otherwise constant phase shift 33 is subject to initial adjustment by means of variable resistor 34, so as to permit a maximum variable phase shift between the currents in windings 11 and 12, this phase shift being caused entirely by the varying impedance of the resonant circuit which includes the capacitance 44 and the inductance 46.

A particular advantage of the aforesaid system consists in the absence of components sensitive to high temperature such as metallic rectifiers or the like. Due to the absence of electronic tubes or other components which generally require a warming-up period, the system herein may be put into immediate operation thereby obviating the necessity of a waiting period.

Although only one embodiment and one application of the invention has been illustrated and described, other changes and modifications in the form and relative arrangement of parts, which will be apparent to those skilled in the art, may be made without departing from the spirit and scope of the invention.

I claim:

1. An electric speed control for a mechanism wherein a prime mover drives an alternator, and a torque motor operates servo means controlling a device adapted to regulate the speed of said prime mover, said control comprising an inductance and a capacitance in a resonant circuit connecting said torque motor to said alternator, a relay responsive to the frequency of said alternator in said resonant circuit, and a low pass filter controlling the current from said alternator to said relay to de-energize said relay and cut out said inductance and capacitance upon the exceeding of a predetermined frequency by said alternator.

2. For use as a speed governing device for an alternator, the combination comprising a torque motor, a resonant circuit for connecting said torque motor to said alternator to correspondingly vary the toque of the motor with alternator speed, a magnetic relay in said resonant circuit, and filter means responsive to the frequency of said alternator to actuate said relay to discontinue said resonant circuit upon the output frequency of said alternator exceeding a predetermined value.

3. For use as a speed governing device for an alternator, the combination comprising a torque motor, a resonant circuit for connecting said torque motor to said alternator to vary the torque of the motor with alternator speed, and frequency responsive means for discontinuing said resonant circuit upon the output frequency of the alternator exceeding a predetermined value.

4. For use as a speed governing device for an alternator; the combination comprising a torque motor having a shaft driven thereby, an inductor and a capacitance in series connecting said motor to said alternator, spring means resisting the turning of said motor shaft adapted to exert a force on said shaft corresponding to the frequency output of said alternator, a relay normally connecting said motor to said alternator and responsive to the frequency from said alternator, and filter means intermediate said alternator and relay controlling the flow of current thereto, said filter means adapted to de-energize said relay upon the frequency of said alternator exceeding a predetermined value to affect said spring to bias said motor shaft to reduce the speed of said alternator.

5. In a speed governing device for a prime mover driving an alternator, the combination comprising a torque motor, spring means resisting the turning of the shaft of said motor, said motor being energized by said alternator, a resonant circuit connecting said motor and said alternator, a relay in said circuit, and a frequency sensing filter governing the flow of current from said alternator to said relay, said resonant circuit normally operating to maintain constant speed below a predetermined frequency, and said filter operating to cut out said resonant circuit upon the frequency exceeding said predetermined value, thereby causing a differential torque between said motor and said spring to rapidly reduce the speed of said prime mover.

6. For use in governing an alternator so as to maintain the frequency of the alternating current output of said alternator at a predetermined value; a speed governing device comprising a torque motor, a speed control element biased by said motor in one sense, other means for biasing said element in an opposite sense, said motor including a fixed phase winding and a variable phase winding, a resonant circuit including inductance and capacitance, said resonant circuit being tuned to a frequency above that of said predetermined output value, said resonant circuit connecting the variable phase winding of said motor to the output of said alternator so as to vary with a change in the frequency of said output the current and current time angle in said variable phase winding with respect to the fixed phase winding so as to cause a steep rate of torque change in said motor with change in the frequency of said output, and additional phase shifting means for connecting said fixed phase winding to the output of said alternator, said phase shifting means for maintaining a maximum phase shift between the current in said variable and fixed phase windings, and thereby said steep rate of torque change in said motor.

PAUL W. FRANKLIN.

References Cited in the file of this patent

UNITED STATES PATENTS

| Number | Name | Date |
|---|---|---|
| 649,006 | Steinmetz | May 8, 1900 |
| 1,505,853 | Brainard | Aug. 19, 1924 |
| 1,646,672 | Whitehorn | Oct. 25, 1927 |
| 1,691,222 | Bohm | Nov. 13, 1928 |
| 1,742,752 | Cady | Jan. 7, 1930 |
| 1,783,162 | Taylor | Nov. 25, 1930 |
| 1,787,435 | Boll | Jan. 6, 1931 |
| 1,872,243 | Churcher | Aug. 16, 1932 |
| 1,873,981 | Rump | Aug. 30, 1932 |
| 1,875,329 | Chireix | Sept. 6, 1932 |
| 1,884,043 | Martin | Oct. 25, 1932 |
| 1,981,040 | Gulliksen | Nov. 20, 1934 |
| 2,001,557 | Von Ohlsen | May 14, 1935 |
| 2,046,438 | Matte | July 7, 1936 |
| 2,151,127 | Logan et al. | Mar. 21, 1939 |
| 2,248,495 | Dupy | July 8, 1941 |
| 2,401,163 | Keller | May 28, 1946 |
| 2,496,730 | Lindbeck et al. | Feb. 7, 1950 |

FOREIGN PATENTS

| Number | Country | Date |
|---|---|---|
| 154,908 | Great Britain | Dec. 3, 1920 |